Sept. 20, 1932.　　　T. S. KATICH　　　1,878,635
FISHING HOOK
Filed March 17, 1932
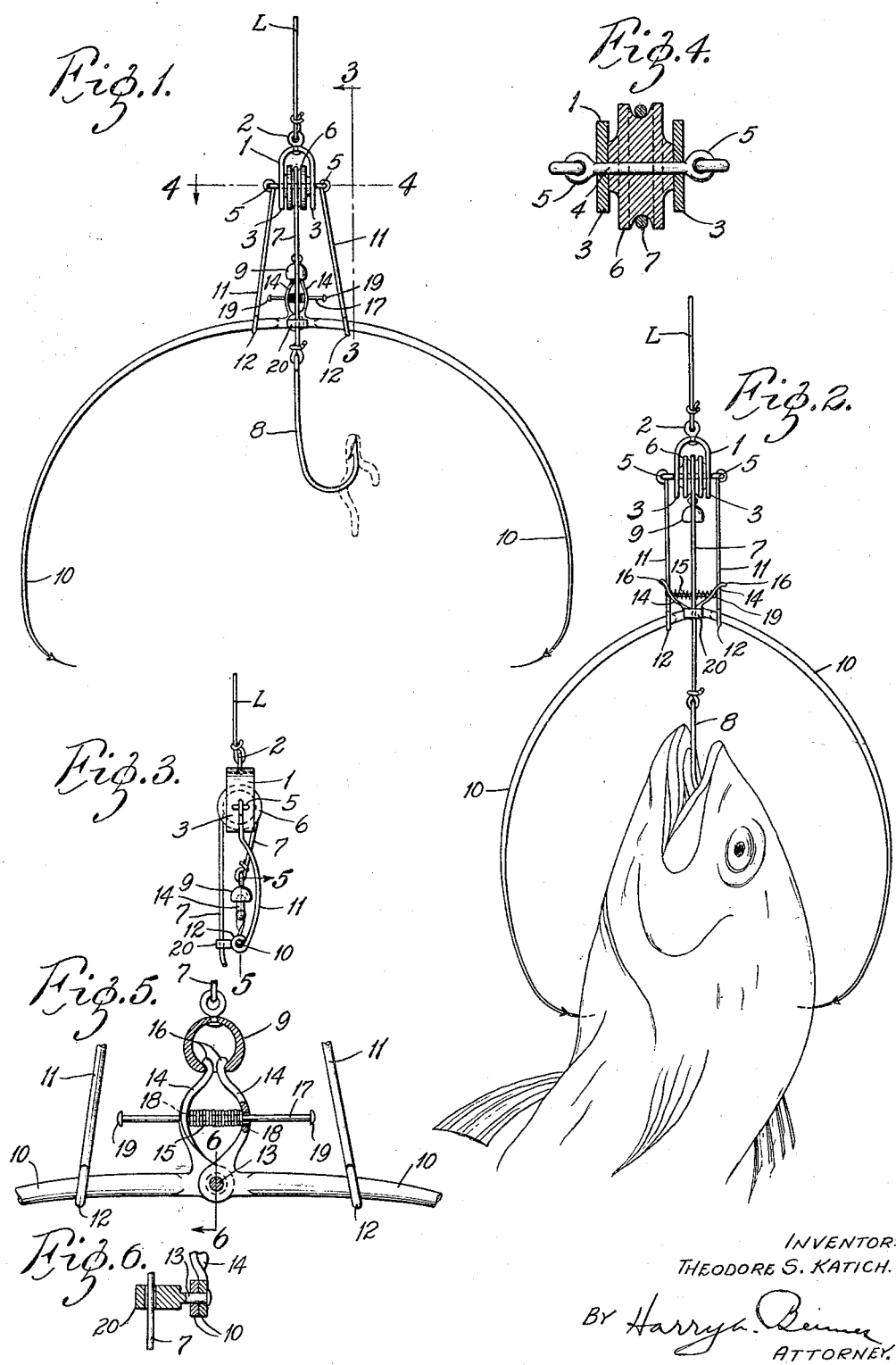
INVENTOR:
THEODORE S. KATICH.
BY Harry L. Renner
ATTORNEY.

Patented Sept. 20, 1932

1,878,635

UNITED STATES PATENT OFFICE

THEODORE S. KATICH, OF ST. LOUIS, MISSOURI

FISHING HOOK

Application filed March 17, 1932. Serial No. 599,440.

My invention has relation to improvements in fishing hooks and consists in the novel features of construction more fully set forth in the specification and pointed out in the claims.

My invention is particularly adapted as a fishing hook to be attached to trot-lines as it embodies means for impaling the fish after being caught so as to prevent him from freeing himself when the line is unattended.

The principal object of the invention is to provide impaling elements which cooperate with the hook and engage the body of the fish, after he has pulled on the hook, to hold him securely; it is a further object of the invention to provide impaling elements similar to a pair of ice tongs which are automatic in their operation when the bait hook is engaged by the fish. Additional objects are to provide a fishing hook having the properties mentioned which is comparatively simple, certain in its operation, and sufficiently rugged to be of practical use. These advantages, as well as others inherent in the invention, will be better apparent from a detailed description thereof in connection with the accompanying drawing, in which:

Figure 1 is an elevational view of my improved fishing hook shown set and baited for action; Fig. 2 is a similar view showing the bait hook engaged by a fish and the cooperating impaling elements closing to impale the fish; Fig. 3 is a vertical section taken on the line 3—3 of Fig. 1; Fig. 4 is a horizontal cross-section taken on the line 4—4 of Fig. 1; Fig. 5 is an enlarged sectional detail taken on the line 5—5 of Fig. 3; and Fig. 6 is a sectional detail taken on the line 6—6 of Fig. 5.

Referring to the drawing, L represents a fishing line having a clevis 1 secured to it by means of an eye 2, and the sides 3, 3 of said clevis having a pin 4 mounted therein, the ends of said pin terminating in eyes 5, 5. A pulley 6 is mounted on the pin 4 and is traversed by a cord 7 carrying a fish hook 8 on one end and a bell-shaped member 9 on the opposite end. A pair of impaling elements 10, 10 shaped similarly to a pair of ice tongs are supported from the pin 4 by means of rods 11, 11 connected to eyes 5, 5 of the pin and connected to the impaling elements 10, 10 by eyes 12, 12 through which the impaling elements pass. The impaling elements are connected by a pivot 13 and have upwardly projecting lever arms 14, 14 outwardly bowed with respect to each other so as to accommodate a spring 15 between them while the ends 16, 16 of the arms are in contacting relation. The spring 15 is mounted on a pin 17 mounted in slots 18, 18 in the arms 14, 14, said pin 17 having its ends riveted over to provide heads 19, 19 so that the pin would be retained in said slots 18, 18. The spring 15 is expansible so that it exerts outward pressure on the arms 14, 14 when they are in their set position (Fig. 5) in which position they are retained by means of the element 9 which serves as a keeper for them.

A perforated lug 20 extends outwardly from pivot 13 and the cord 7 is threaded through the lug 20 so as to hold the hook 8 in a definite fixed position. It is obvious that when the impaling elements 10, 10 are spread apart (as shown in Figs. 1 and 5) the lever arms 14, 14 are brought together and spring 15 compressed, in which position said lever arms may be held by the keeper 9. If now the hook 8 is pulled downwardly by a fish the keeper 9 will be pulled up to release arms 14, 14. The spring 15 immediately forces the arms 14, 14 apart and the impaling elements 10, 10 together whereupon the fish is gigged by the points of the impaling elements (as shown in Fig. 2). It will be observed that the rods 11, 11 are bent slightly so as to clear the pin 17 so as not to interfere with the operation of the device. These rods transmit the strains imposed on the elements 10, 10 directly to the clevis 1 and, of course, the fishing line L.

Having described my invention, I claim:

1. A fishing hook comprising a clevis, a pair of impaling tongs carried by said clevis, said tongs having setting elements, a bait hook carried by the clevis, a holding element connected to the bait hook for engaging the setting elements to maintain the tongs open, said holding element operating to release the setting elements with a pull on the bait hook.

2. A fishing hook comprising a clevis, a pulley carried by said clevis, a pair of impaling tongs suspended from said clevis and provided with setting elements, a bait hook and a tong holding element connected by a cord traversing said pulley, said holding element cooperating with the setting elements to hold the tongs open.

In testimony whereof I hereunto affix my signature.

THEODORE S. KATICH.